March 3, 1970 J. W. JEWITT ET AL 3,498,692

LIGHT PEN

Filed Nov. 9, 1967

INVENTORS
ROBERT A. WAINER
JAMES W. JEWITT
BY
Frank D. Prager
ATTORNEY

United States Patent Office 3,498,692

Patented Mar. 3, 1970

3,498,692

LIGHT PEN

James W. Jewitt, King of Prussia, and Robert A. Wainer, Maple Glen, Pa., assignors to Philco-Ford Corporation, Philadelphia, Pa., a corporation of Delaware Filed Nov. 9, 1967, Ser. No. 681,722
Int. Cl. G02b *5/14*
U.S. Cl. 350—96 3 Claims

ABSTRACT OF THE DISCLOSURE

Light pen for conducting light to or from an illuminated spot, for instance a spot on the phosphor screen of a cathode ray tube, through a fiber optics cable, to a photoelectric transducer. The pen has a spring-actuated, normally closed light shutter at its tip, which opens when the pen is brought to bear against the illuminated spot on the screen or other light source.

BACKGROUND AND SUMMARY OF THE INVENTION

The invention pertains to a light pen, used in display or communication apparatus, for example in a computerized educational system. In such apparatus, various words or drawing elements or other indicia are formed by illuminated spots, for instance on a screen. In one typical application, a student is expected to choose some word, letter or picture displayed on the screen, and to point it out by a light pen. He thereby causes certain responses in a computerized system, which in turn produce other displays, for instance audible or visible educational remarks or instructions.

For successful use in such a system it is important that the light pen be able to transmit light signals to or from narrowly defined spots, thereby making it possible for the user to choose one of a large selection of indicia by means of the light pen. In this respect the light pens provided thus far proved unsatisfactory, because of a tendency to transmit light to and from adjacent illuminated areas. If special care was taken to provide sharp definition of the light signals transmitted, a cumbersome device resulted which required operation of special control buttons or the like.

The invention provides a light pen that is easy to manipulate and which nevertheless provides sharp definition of a single screen element. It does this by novel utilization of shutter action, at the tip of the light pen.

DESCRIPTION OF THE PREFERRED EMBODIMENT

Figure 1:
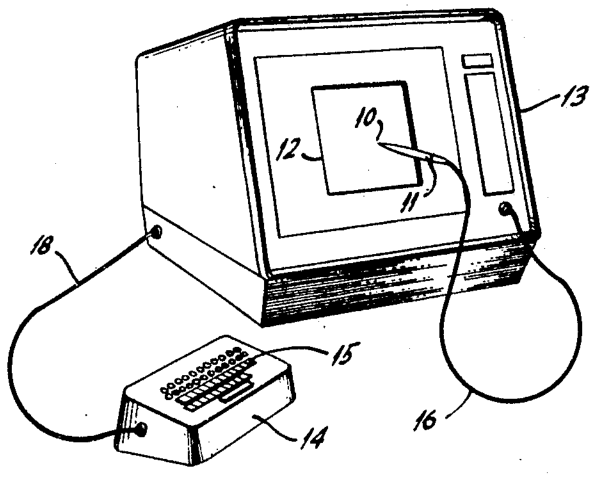
FIGURE 1 is a perspective view showing the light pen in use.

As shown in FIGURE 1, tip 10 of light pen 11 is normally held in front of phosphor screen 12, which screen is incorporated in cabinet 13 of a computerized educational system. Also provided is control unit 14 having push-buttons 15 for controlling the system. As further described below, connection between pen 11 and cabinet 13 is made through a flexible, opaque tube 16, attached to the end of pen 11 remote from tip 10. Control unit 14 is connected to the computer unit by electric cable 18, enabling the user to switch to various programs, interrogate them, repeat them, and otherwise control them.

Figure 2:
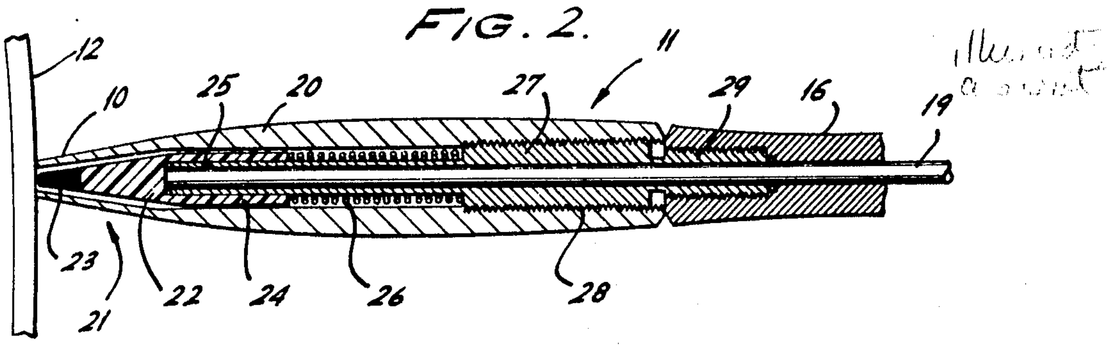
FIGURE 2 is a sectional view of the light pen itself, shown on an enlarged scale, the section being taken centrally along the pen and the new pen being shown here with its tip on the phosphor screen, and its shutter opened.
Figure 3:
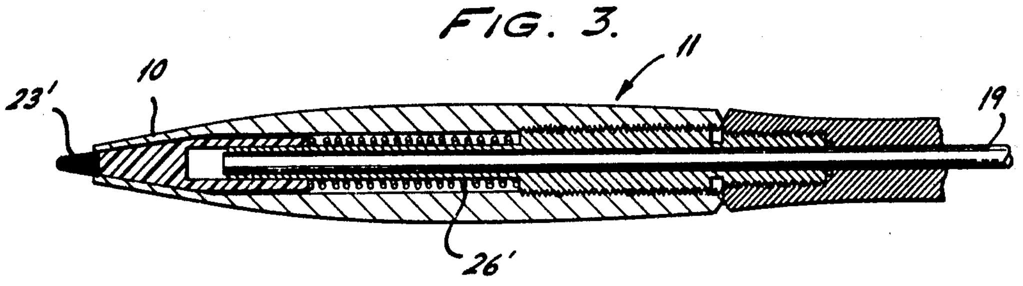
FIGURE 3 is a sectional view generally similar to FIGURE 2 but showing the pen with the tip released, and the shutter closed.

As shown fully in FIGURES 2 and 3, an elongate optical fiber or light guide element 19 is provided, which extends from the vicinity of pen tip 10, centrally through housing 20 of the pen, and then through flexible, opaque tube 16 to computer cabinet 13 (FIGURE 1), in order to transmit a light signal from screen 12 to photoelectric transducer means (not shown) in this cabinet. The light guiding fiber can be made for instance of the synthetic plastic material marketed by E. I. du Pont de Nemours & Co., under the trade name Crofon.

In accordance with the invention, tip 10 of light pen 11 contains a selectively operable light stop or shutter 21, FIGURE 2. This selective light stop, as shown, comprises a movable, transparent, light guiding tip member 22—fabricated for instance from the synthetic plastic material made by Rohm & Haas and known as Plexiglas, particularly from a piece of clear, polished, and transparent Plexiglas, desirably of conical shape as indicated. The tip member also includes an opaque front or apex portion 23, made for instance of a piece of black, opaque Plexiglas, cemented to transparent tip member 22. The movable member of clear Plexiglas has, in the rear portion thereof, a hollow cylindrical extension 24. This extension is slidable on a metallic bushing 25 closely embracing the optical fiber and surrounding a front part of optical fiber 19. A compression spring 26 is interposed between a free end surface of slidable extension 24 and the opposite surface of a stationary plug 27, which plug is formed as an extension of bushing 25 and closes the rear end of housing 20. Thus the slidably mounted tip member 22 is normally urged forwardly (toward left in FIGURE 2). The forward motion of the slidable tip member is limited by the stationary tip 10 of housing 20. This stationary tip, as shown, advantageously has an inside surface in form of a hollow cone frustum, matching the generally conical form of slidable tip 23. Housing 20 and its tip 10 are made of opaque material, such as black nylon.

It will be seen that pen housing 20 in the new instrument 10, 11 constitutes in essence a holder for cable 16, optical fiber 19, and the movable front element and light stop 22, 23 of said pen housing. Housing 20 is used to hold front element 22 of fiber 19 in front of screen 12. On rightward and pen-opening motion of the shutter tip 23, resiliently seated at 25, 26, the optical fiber receives light, and receives it only from the narrow screen area confined by hollow, opaque tip 10. It receives no appreciable light from any screen areas or other sources outside this tip.

In operation of the new apparatus the student holds pen 11 in his hand and brings it to the front of phosphor screen 12 whereon the desired pictures, words, or symbols are displayed from time to time. In order properly to read the program the student brings tip 10 of the light pen down onto screen 12, at a correctly selected spot, where the proper picture or picture element or symbol is displayed. As the pen is set down the shutter opens, and light from the selected spot is transmitted to the computer. The computer then responds to the light from the selected spot, by instrumentation which is not part of the present invention, and automatically determines whether the pen has been set down at the correct spot or at an incorrect spot, depending upon which it produces suitable responses and instructions, such for instance as an indication of "error."

Since the new shutter action allows the light pen and connected computer to discriminate between large numbers of spots on the illuminated screen, the system is thereby enabled to operate in educational programs of a great many types, including highly sophisticated programs with many indicia or symbols to choose from, if this be desired. Nevertheless the light pen employed in accordance with this invention is a tool of the utmost simplicity which can be manipulated with perfect ease and considerable speed.

We claim:

1. In a light pen, a tubular housing having a tip of opaque material; an elongate light control plug extending in and along said housing and through said tip and including an opaque, generally conical shutter for closing said tip; spring means biasing said light control plug against an inside surface of the tip to close the tip by the shutter but adapted, when the tip is brought to bear against an object, resiliently to open an annular portion of the tip, around the shutter, for passage of light; and a fiber optics cable extending into the housing, remotely from the tip, and having an end in the housing, near said annular portion.

2. In a light pen as described in claim 1, means for mounting the light control plug in the housing for sliding motion along the axis of the housing.

3. In a light pen as described in claim 2, a tube rigidly coaxially mounted in said housing to hold, inside said tube, said end of the fiber optics cable and to provide, around the same, the means for mounting the light control plug.

References Cited

UNITED STATES PATENTS 2,368,839 2/1945 Jansen.
3,305,689 2/1967 Leavy et al. ---------- 250—227

FOREIGN PATENT 250,033 4/1926 Great Britain.

DAVID H. RUBIN, Primary Examiner

U.S. Cl. X.R.

95—1.1; 240—6.46; 250—227; 350—266